(12) United States Patent
Park et al.

(10) Patent No.: US 11,561,038 B2
(45) Date of Patent: Jan. 24, 2023

(54) GRAIN REFRIGERATOR

(71) Applicants: Sung-Chul Park, Cheonan-si (KR); Nam-Gyu Park, Pyeongtaek-si (KR)

(72) Inventors: Sung-Chul Park, Cheonan-si (KR); Nam-Gyu Park, Pyeongtaek-si (KR)

(73) Assignees: Sung-Chul Park; Nam-Gyu Park

( * ) Notice: Subject to any disclaimer, the term of this patent is extended or adjusted under 35 U.S.C. 154(b) by 137 days.

(21) Appl. No.: 16/881,185

(22) Filed: May 22, 2020

(65) Prior Publication Data
US 2020/0284496 A1 Sep. 10, 2020

Related U.S. Application Data

(63) Continuation of application No. PCT/KR2018/002294, filed on Feb. 23, 2018.

(30) Foreign Application Priority Data

Nov. 23, 2017 (KR) .......................... 10-2017-0157327
Feb. 23, 2018 (KR) .......................... 10-2018-0022249

(51) Int. Cl.
*F25D 21/04* (2006.01)
*A01F 25/16* (2006.01)
(Continued)

(52) U.S. Cl.
CPC ............ *F25D 21/04* (2013.01); *A01F 25/163* (2013.01); *A23B 9/10* (2013.01); *E04H 7/24* (2013.01);
(Continued)

(58) Field of Classification Search
CPC .......... F25D 21/04; F25D 11/00; F25D 21/14; A01F 25/163; E04H 7/24; A23B 9/10; A23V 2002/10
See application file for complete search history.

(56) References Cited

U.S. PATENT DOCUMENTS

2005/0255209 A1* 11/2005 Park ........................ A47J 47/06
426/524

FOREIGN PATENT DOCUMENTS

JP            2004105918 A     4/2004
KR    10-2005-0070642 A     7/2005
(Continued)

OTHER PUBLICATIONS

Translation of KR-20080049950-A.*
(Continued)

*Primary Examiner* — Elizabeth J Martin
(74) *Attorney, Agent, or Firm* — Park & Associates IP Law, P.C.

(57) ABSTRACT

The present invention relates to a grain refrigerator including a housing having a grain storage space formed thereon to discharge grains stored therein, a fixing rod located at the center of the inside lower portion of the housing, dew condensation prevention means fixed to the fixing rod, a support plate located on a top periphery of the dew condensation prevention means, an evaporator disposed on the support plate to generate cool air, and a cooling tube disposed on a top periphery of the support plate on the outside of the evaporator to cool the grains, wherein a first pipe and a second pipe connected to the lower portion of the evaporator pass through a through hole of the support plate and a first drain hole of the dew condensation prevention means and are thus exposed to the outside of the housing.

2 Claims, 4 Drawing Sheets

(51) Int. Cl.
*A23B 9/10* (2006.01)
*E04H 7/24* (2006.01)
*F25D 11/00* (2006.01)
*F25D 21/14* (2006.01)

(52) U.S. Cl.
CPC .............. *F25D 11/00* (2013.01); *F25D 21/14* (2013.01); *A23V 2002/00* (2013.01)

(56) References Cited

FOREIGN PATENT DOCUMENTS

| | | |
|---|---|---|
| KR | 10-0531504 B1 | 11/2005 |
| KR | 20080049950 A  * | 1/2006 |
| KR | 10-0620550 B1 | 9/2006 |
| KR | 10-850923 B1 | 8/2008 |
| KR | 10-2009-0026909 A | 3/2009 |
| KR | 10-2011-0062725 A | 6/2011 |
| KR | 10-2011-0094402 A | 8/2011 |
| KR | 10-2012-0046437 A | 5/2012 |
| KR | 10-1170718 B1 | 8/2012 |
| KR | 10-2013-0068731 A | 6/2013 |
| KR | 10-1766309 B1 | 8/2017 |

OTHER PUBLICATIONS

International Search Report (PCT/KR2018/002294), WIPO, dated Feb. 8, 2019.
Korean Notice of Allowance (KR 10-2018-0022249), KIPO, dated Mar. 15, 2019.
Korean Notice of Allowance (KR 10-2017-0157327), KIPO, dated May 18, 2019.

* cited by examiner

GRAIN REFRIGERATOR

REFERENCE TO RELATED APPLICATIONS

This is a continuation of International Patent Application PCT/KR2018/002294 filed on Feb. 23, 2018, which designates the United States and claims priority of Korean Patent Application No. KR 10-2017-0157327 filed on Nov. 23, 2017 and KR 10-2018-0022249 filed on Feb. 23, 2018, the entire contents of which are incorporated herein by reference.

FIELD OF THE INVENTION

The present invention relates to a grain refrigerator for storing rice, various grains, and the like, to a low temperature, and more particularly, to a grain refrigerator that is capable of allowing an evaporator located at the inside center of a housing to provide a refrigeration effect for grains stored in the housing to be provided with refrigerant inlet and outlet pipes and a drain pipe easily and simply disposed on the inside bottom of the housing, thereby greatly improving a work efficiency for installation.

BACKGROUND OF THE INVENTION

A conventional grain refrigerator for maturing and storing grains to an appropriate low temperature is disclosed in Korean Patent No. 10-0620550 (entitled: refrigerator having evaporator located therein) as issued to the same applicant as the invention, and as shown in FIG. 1, the conventional grain refrigerator includes a plate 2 fixed horizontally to the inside center of a housing and having a through hole formed thereon, a grain storage portion formed on top of the plate 2 to store grains therein, and a discharge container located on top of a partition wall located just under the through hole to put the grains discharged through the through hole of the plate 2. The discharge container is movably placed on top of the partition wall, and a compressor 7 is located under the plate 2.

Further, an evaporator 130 is placed on top of the center of the plate 2, and a cooling rod 100 is disposed inside the evaporator 130. The plate 2 is inclined toward the through hole 21 formed at the center thereof to allow the grains stored in the grain storage portion to be discharged downward through the through hole 21, and in detail, support plates 22, 23 and 24 are located on horizontal planes with respect to four edges of the plate 2 by means of welding. A vertical rod 101 is straightly located up on the center of the support plates 22 connecting both side edges of the plate 2 by means of welding, and screw threads are formed by given length along the upper and lower peripheries of the vertical rod 101.

Further, a cooling rod lower plate 110 having a through hole formed at the center thereof is fitted to the vertical rod 101. In this case, the cooling rod lower plate 110 has a protruding projection 111 formed between the through hole and the outer peripheral surface thereof in a circumferential direction, and if it is fitted to the vertical rod 101, a washer 104 and a nut 102 are fitted to the vertical rod 101 to allow the cooling rod lower plate 110 to be fitted to the vertical rod 101.

In this case, the underside of the cooling rod lower plate 110 is seated onto a connection portion of the support plate 22 and the support plate 23 and a connection portion of the support plate 22 and the support plate 24, thereby rigidly fixing the cooling rod lower plate 110 to the vertical rod 101.

Also, a guide tube 105 is fitted to the vertical rod 101 in such a manner as to be located inside the protruding projection 111 of the cooling rod lower plate 110, and an elastic sponge tube 106, which is made of a sponge material, is insertedly placed on top of the guide tube 105. When the evaporator 130 is fitted to the outer peripheral surface of the sponge tube 106, the guide tube 105 fixedly supports the sponge tube 106. Further, a cooling rod cylinder 120 is insertedly located on the outer peripheral surface of the protruding projection 111 of the cooling rod lower plate 110. The evaporator 130 is located on the outside of the sponge tube 106.

The evaporator 130 includes a linear part 131 extended straightly from top to bottom and a spiral part 132 extended upward from the bottom of the linear part 131, and a capillary pipe 133 is connected to top of the linear part 131 to introduce a refrigerant into the linear part 131 therefrom.

Also, an insulation tube 150 made of an insulating material is located at the outside of the spiral part 132, and a heater 160 formed of a surface heating element or nichrome wire is located between the insulation tube 150 and the cooling rod cylinder 120 in such a manner as to be heated by means of electricity supplied from the outside. Further, a temperature sensor 170 is located between the cooling rod cylinder 120 and the insulation tube 150 to output a sensed temperature to a controller.

Furthermore, a cooling water guide pipe 180 is located on the cooling rod lower plate 110 to allow the water collected inside the cooling rod to flow to the compressor 7, and a cooling rod upper plate 140 is contactedly located on the top end periphery of the cooling rod cylinder 120. The cooling rod upper plate 140 has a cylindrical tube open on the bottom thereof and in such a manner as to come into contact with top of the cooling rod cylinder 120. The cooling rod upper plate 140 has a through hole formed on a given position of the side peripheral surface thereof and a through hole formed on a center of a curved top surface thereof to pass the vertical rod 101 therethrough.

The vertical rod 101 passes through the through hole 141 formed on the top surface of the cooling rod upper plate 140, and a discharge pipe 134 connected to the top end periphery of the spiral part 132 of the evaporator 130 and the capillary pipe 133 connected to top of the linear part 131 are exposed to the outside through the through hole 141, so that a washer 142 and a nut 143 are fixedly fitted to the vertical rod 101.

After the discharge pipe 134 is connected to a connection pipe, next, and it is exposed to the outside of the housing through an induction tube 144, and the induction tube 144 is insertedly coupled to the through hole 141 of the cooling rod upper plate 140.

Further, a cap 145 is covered on the top surface through hole 141 of the cooling rod upper plate 140 because the top of the vertical rod 101 protrudes outward from the cooling rod upper plate 140 and the nut 143 is exposed outward therefrom, thereby hiding the top of the vertical rod 101 and the nut 143. In this case, the cap 145 is attached to the cooling rod upper plate 140 by means of an adhesive.

According to the conventional grain refrigerator as mentioned above, the cooling rod lower plate 110 is located on the underside of the cooling rod cylinder 120, the cooling rod upper plate 140 is located on the top of the cooling rod cylinder 120, and the cooling rod 100 is located inside the evaporator 130.

According to the conventional grain refrigerator, further, the vertical rod 101 is located on the cooling rod lower plate 110 to maintain the evaporator 130 vertically, and the discharge pipe is located on the cooling rod lower plate 110 to discharge the water collected on the cooling rod lower plate 110 to the outside. Also, the cooling rod upper plate 140 has to be configured to have fixing means for fixing the vertical rod 101 thereto and the induction tube 144 for drawing the start portion (capillary pipe) and the end portion (discharge pipe) connected to the evaporator 130 to the outside, which undesirably causes a complicated structure.

Due to the above-mentioned complicated structure, accordingly, the conventional grain refrigerator has the following problems. An assembling process becomes complicated; skilled technologies are needed for the assembling process; a defect rate becomes high; the number of parts to be assembled increases; and a manufacturing cost is raised.

SUMMARY OF THE INVENTION

Accordingly, the present invention has been made in view of the above-mentioned problems occurring in the related art, and it is an object of the present invention to provide a grain refrigerator that is capable of allowing a coupling process of parts to be simplified, thereby reducing the man hour required to improve reliability and productivity of a product.

It is another object of the present invention to provide a grain refrigerator that is capable of enhancing a cooling efficiency, thereby improving the refrigeration effect of grains stored therein.

It is yet another object of the present invention to provide a grain refrigerator that is capable of preventing dew condensation from occurring, thereby avoiding grains stored therein from being damaged.

To accomplish the above-mentioned objects, according to the present invention, there is provided a grain refrigerator including: a housing located therein to store grains and discharge the grains to the outside by means of opening and closing means located at a lower portion thereof; a bracket located at an inside lower portion of the housing and having a fixing rod located at the center thereof in such a manner as to be long in an upward direction; dew condensation prevention means having a shape of a cylinder whose top is open, located on top of the bracket, and configured to have a space portion formed at the inside thereof, a first insertion hole formed at the bottom thereof to insert the fixing rod thereinto, and a first drain hole formed spaced apart from the first insertion hole; a support plate having a shape of a disc supported against a top periphery of the dew condensation prevention means and configured to have a fixing hole formed at the center of top thereof to fixedly pass the fixing rod therethrough and a through hole spaced apart from the fixing hole on the outside of the fixing hole; an evaporator located on top of the support plate, having a spiral outer appearance, and configured to have a refrigerant inlet and a refrigerant outlet formed on a lower portion thereof, the refrigerant inlet being connected to a first pipe and the refrigerant outlet being connected to a second pipe; and a cooling tube having a shape of a cylinder whose bottom is open and located on top of the support plate in such a manner as to insert the evaporator thereinto to discharge cool air to the outside, wherein the first pipe and the second pipe connected to the lower portion of the evaporator pass through the through hole of the support plate and the first drain hole of the dew condensation prevention means and are thus exposed to the outside of the housing.

According to the present invention, desirably, the grain refrigerator further includes a drain pipe whose one end is located inside the cooling tube and whose other end is located to the outside of the housing to discharge condensed water in the cooling tube to the outside, the drain pipe passing through the through hole of the support plate and the first drain hole of the dew condensation prevention means.

According to the present invention, desirably, the first pipe, the second pipe, and the drain pipe are located inside a tube whose both ends are open, and the tube passes through the first drain hole of the dew condensation prevention means and is thus exposed to the outside.

According to the present invention, desirably, a space between the inner peripheral surface of the tube and the outer peripheral surfaces of the first pipe, the second pipe, and the drain pipe located inside the tube is filled with a synthetic resin so as to prevent external air from being introduced thereinto.

According to the present invention, desirably, the grain refrigerator further includes a pipe adapted to insert the tube thereinto, a space between the tube and the pipe being filled with a filler.

According to the present invention, desirably, the grain refrigerator further includes a base plate located on top of the support plate and having a concave portion formed between a center and an outer peripheral surface thereof, a second insertion hole formed at the center thereof to pass the fixing rod therethrough, and a second drain hole formed at the concave portion thereof, the first pipe, the second pipe, and the drain pipe passing through the second drain hole.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE INVENTION

Hereinafter, the present invention will be in detail disclosed with reference to the attached drawings.

Figure 1:
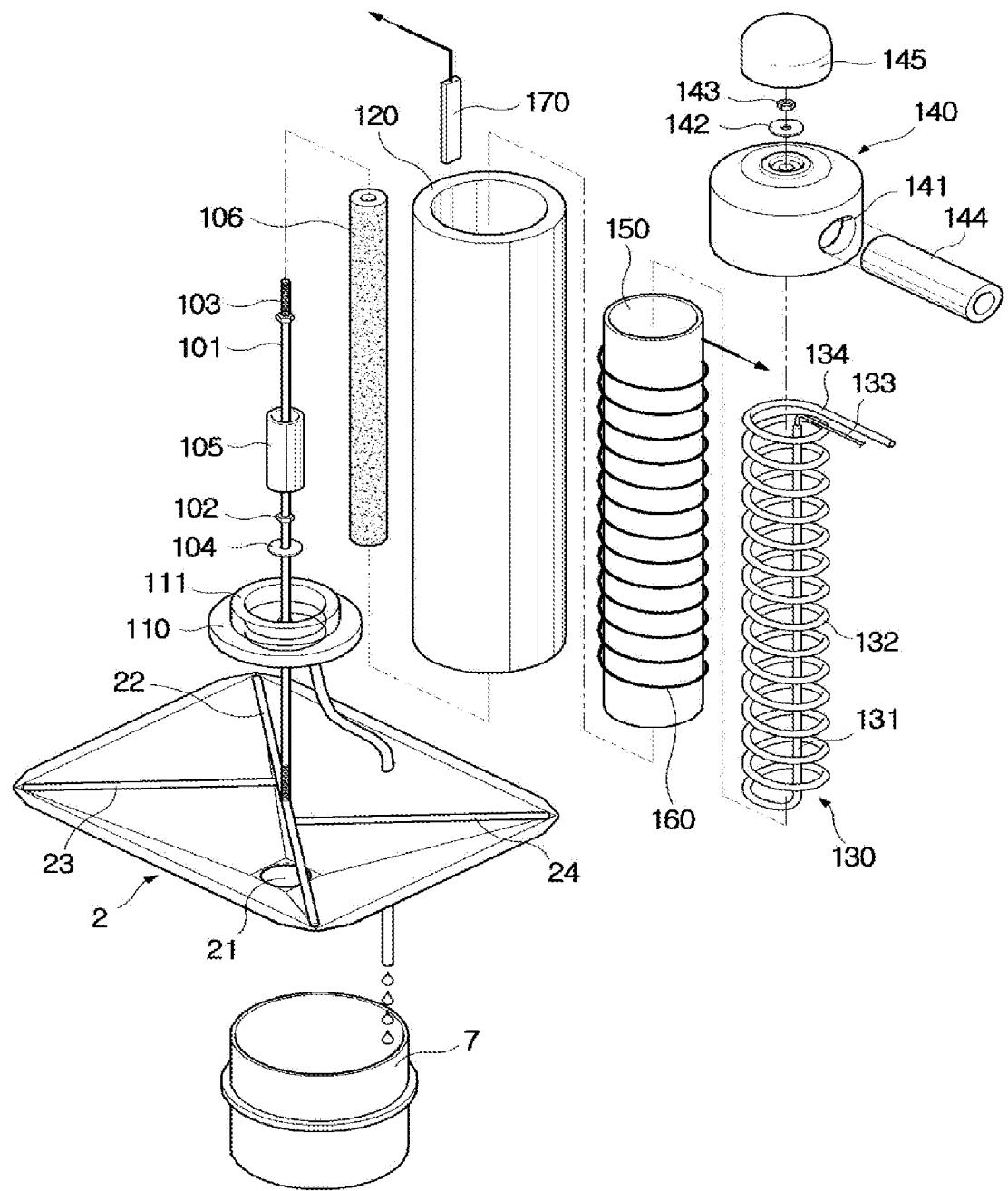
FIG. 1 is an exploded perspective view showing a conventional grain refrigerator.
Figure 2:
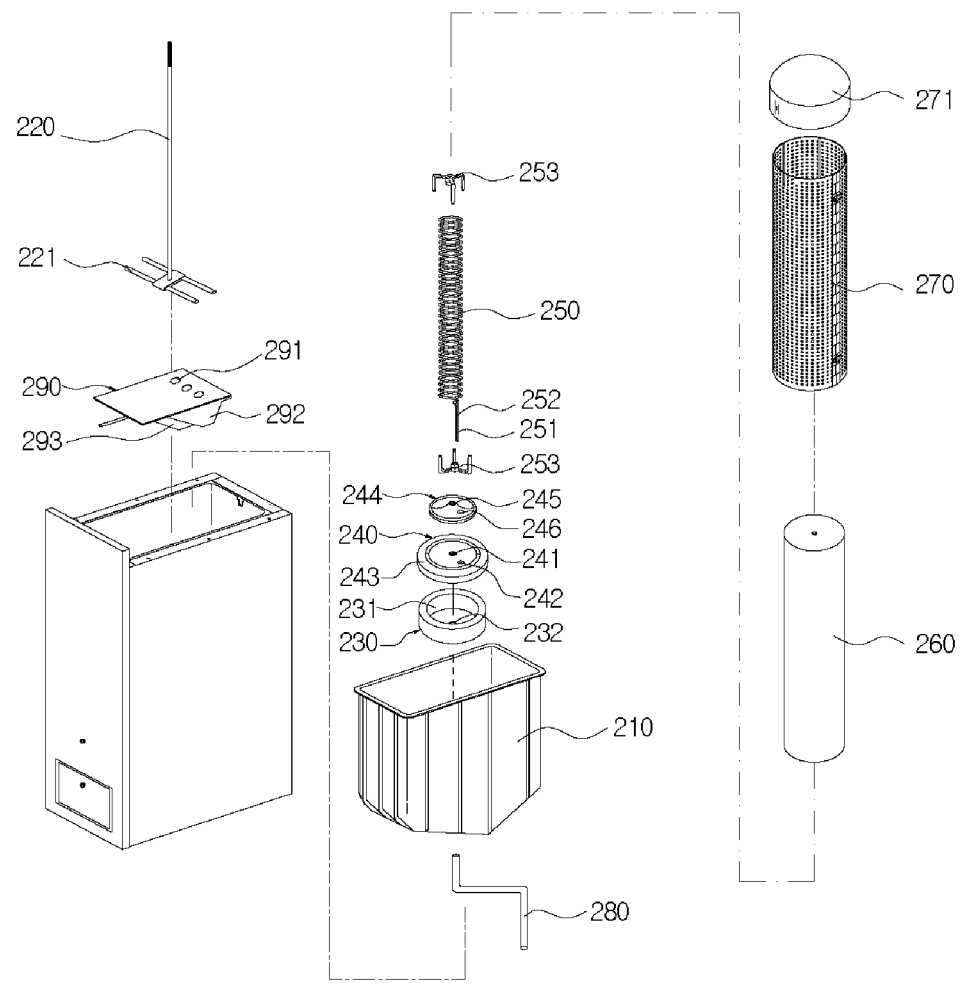
FIG. 2 is an exploded perspective view showing a grain refrigerator according to the present invention.
Figure 3:
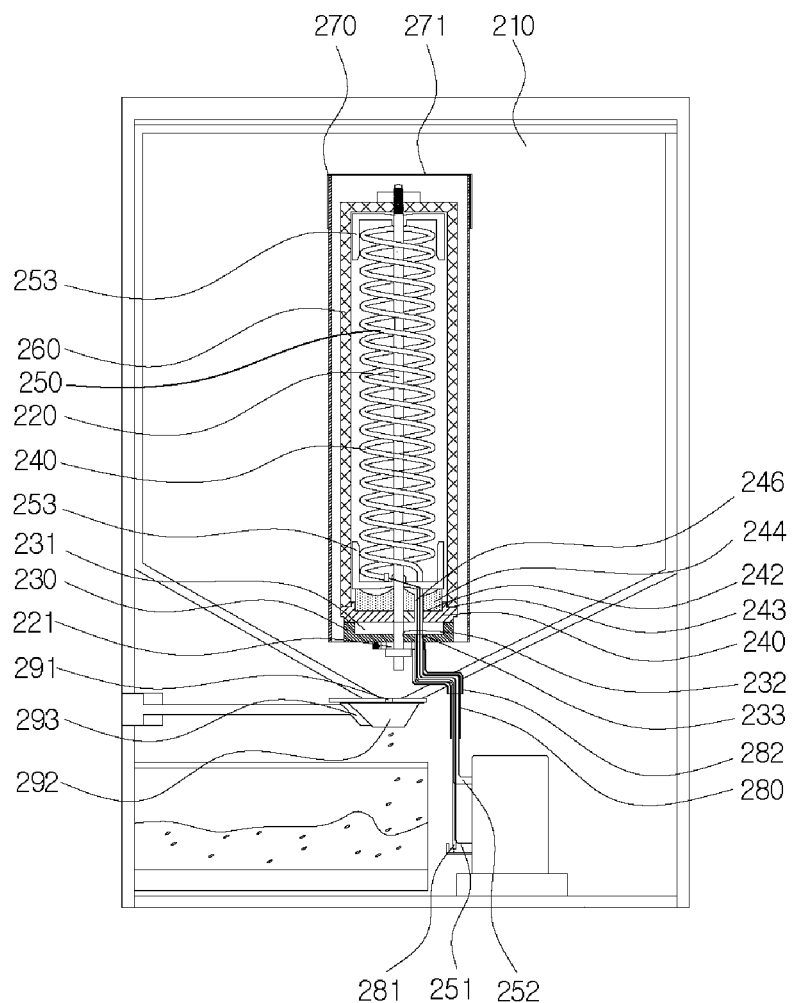
FIG. 3 is a sectional view showing main parts of the grain refrigerator according to the present invention.
Figure 4:
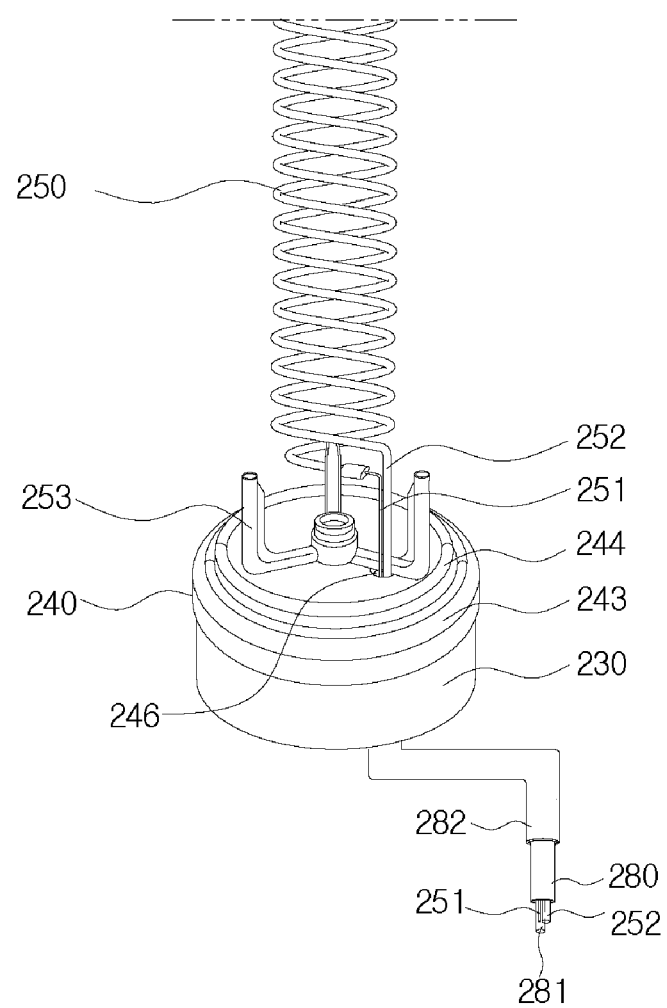
FIG. 4 is a longitudinal sectional view showing a coupled state of the grain refrigerator according to the present invention.

FIG. 2 is an exploded perspective view showing a grain refrigerator according to the present invention, FIG. 3 is a sectional view showing main parts of the grain refrigerator according to the present invention, and FIG. 4 is a longitudinal sectional view showing a coupled state of the grain refrigerator according to the present invention.

As shown in FIGS. 2 to 4, a grain refrigerator 200 according to the present invention includes a housing 210 having a grain storage space formed thereon to discharge grains stored therein to the outside by means of opening and closing means located at a lower portion thereof, a fixing rod 220 located at the center of the inside lower portion of the housing 210 by means of a bracket 221, dew condensation prevention means 230 fixed to the bracket 221 and the fixing rod 220, a support plate 240 located on a top periphery of the dew condensation prevention means 230, an evaporator 250 disposed on the support plate 240 to generate cool air, a cooling tube 260 disposed on a top periphery of the support plate 240 on the outside of the evaporator 250 to cool the grains, a mesh net 270 disposed on the outside of the cooling tube 260 to prevent the grains stored in the housing 210 from coming contact with the cooling tube 260, fixing means 280 for insertedly fixing pipes to the support plate 240, the pipes being adapted to introduce a refrigerant into the evaporator 250, to discharge the refrigerant from the evaporator 250, to drain condensed water, and a grain discharge stand 290 located on a front underside of the housing 210 to discharge the stored grains in the housing 210 to the outside.

Top of the housing 210 is open and a lower portion of the housing 210 is inclined downward to form a conical shape, so that the housing 210 has a grain discharge hole formed at the center of the lowermost portion thereof. The grains are refrigerated and stored inside the housing 210.

The fixing rod 220 is fixed to the center of the inside bottom surface of the housing 210 in such a manner as to be located long in an upward direction, and a lower periphery end of the fixing rod 220 is fixed to the bracket 221 having a shape of a plate, the bracket 221 having a pair of bars whose both ends are fixed to both sides of the inside lower portion of the housing 210 and a plate for coveringly fixing the pair of bars thereto.

The fixing rod 220 is fixed to the center of the bracket 221 located on both sides of the inside lower portion of the housing 210, so that it can be located long in the upward direction at the inside center of the housing 210.

The dew condensation prevention means 230 is fixedly disposed to top of the bracket 221 by means of the fixing rod 220 in such a manner as to block air in the upper portion of the housing 210 from air in the lower portion of the housing 210 and thus to prevent occurrence of dew condensation in the upper portion of the housing 210. The dew condensation prevention means 230 has a shape of a cylinder whose top is open and is configured to have a space portion 231 formed at the inside center thereof, a first insertion hole 232 formed at the center of the bottom of the space portion 231 to insert the fixing rod 220 thereinto, and a first drain hole 233 formed on one side of the first insertion hole 232.

In detail, the dew condensation prevention means 230 has the shape of the cylinder whose top is open and is configured to have the space portion 231 formed therein so that air of the space portion 231 is prevented from directly contacting with the cooling tube 260 as will be discussed later or from flowing to the upper portion of the housing 210. Accordingly, dew condensation, which occurs by a temperature difference between the upper portion and the lower portion of the housing 210, can be prevented.

The underside of the support plate 240 is supported against the top periphery of the dew condensation prevention means 230 fitted to the fixing rod 220, and accordingly, the support plate 240 is coupled to the dew condensation prevention means 230 by means of the fixing rod 220. The support plate 240 has a shape of a cylinder or a shape of a disc having a given thickness and is configured to have a fixing hole 241 formed at the center of top thereof to fixedly pass the fixing rod 220 therethrough, a through hole 242 spaced apart from the fixing hole 241 on the outside of the fixing hole 241 to discharge water, and an installation peripheral surface 243 formed on an outer peripheral surface of the through hole 242 to locate the cooling tube 260 thereon.

In detail, the support plate 240 is fitted to the fixing rod 220 fixed long in the upward direction to the center of the top of the dew condensation prevention means 230, so that the support plate 240 is fixed to the dew condensation prevention means 230 by means of the fixing rod 220.

Further, the support plate 240 includes a base plate 244 disposed on top thereof to drain condensed water.

As shown in FIG. 3, the base plate 244 has a concave portion formed between a center and an outer peripheral surface thereof, a second insertion hole 245 formed at the center thereof to pass the fixing rod 220 therethrough, and a second drain hole 246 formed at the concave portion on the outside of the second insertion hole 245. If the condensed water is produced on the base plate 244, it is collected on the concave portion and is then drained to the outside by means of the drain pipe as will be discussed later which is located on the second drain hole 246.

Further, the base plate 244 is fitted to the fixing rod 220 through the second insertion hole 245 and is seated onto the top of the support plate 240, so that the base plate 244 can drain the condensed water, without any separation or escape from the support plate 240.

The evaporator 250 has a spiral outer appearance and is configured to have a refrigerant inlet for introducing a refrigerant therein and a refrigerant outlet for circulatingly discharging the introduced refrigerant, which are formed on a lower portion thereof.

Further, the refrigerant inlet is connected to a first pipe 251 for introducing a high pressure and low temperature refrigerant compressed by a compressor (not shown) therein, and the refrigerant outlet to a second pipe 252 for discharging a low pressure and high temperature refrigerant to the compressor.

A pair of support legs 253 is located on top and bottom of the evaporator 250, respectively, in such a manner as to fixedly fit the fixing rod 220 to the center thereof and to surroundingly support the outer peripheral surface of the evaporator 250 against the outer surface thereof.

In detail, the evaporator 250 is configured to have the refrigerant inlet connected to the first pipe 251 and have the refrigerant outlet connected to the second pipe 252, and further, the top and bottom of the evaporator 250 are surrounded with one pair of support legs 253 whose center is fitted to the fixing rod 220, so that the evaporator 250 can be fixed to the fixing rod 220, without any separation or escape from the fixing rod 220, and can circulate the refrigerant introduced into the first pipe 251 to the second pipe 252 to generate cool air through heat exchange with surrounding air, thereby making the surrounding air cold.

The cooling tube 260 has a shape of a cylinder whose top is closed and whose bottom is open and is disposed on the outside of the evaporator 250. The cooling tube 260 is located inside the housing 210 to discharge cool air to the outside of the evaporator 250, thereby making the grains in the housing 210 cool.

The top of the cooling tube 260 inserts the fixing rod 220 located in the upward direction at the inside center of the housing 210 thereinto, and the underside periphery of the cooling tube 260 is located on the top periphery of the support plate 240, so that the cooling tube 260 surrounds the evaporator 250.

The cooling tube 260 is made of a breathable material capable of generating far infrared rays like yellow ocher, charcoal, and so on, and desirably, glaze is applied to a the inner peripheral surface of the cooling tube 260 to block the introduction of moisture from the outside.

Accordingly, the cooling tube 260 is made of a material capable of accumulating moisture thereon, but since the inner peripheral surface thereof is applied with the glaze for blocking the moisture, the moisture at the inside of the cooling tube 260 is not emitted to the outside thereof. As the cooling tube 260 is located on the installation peripheral surface 243 of the support plate 240, further, it discharges the cool air of the evaporator 250 located at the inside thereof and absorbs the internal moisture of the housing 210. Moreover, the cooling tube 260 makes the interior of the housing 210 cool, but it prevents the direct introduction or contact of external air by means of the space portion 231 of the dew condensation prevention means 230 located thereunder and the fixing means 280 as will be discussed later located on the first drain hole 233, so that it can make the interior of the housing 210 cool to store the grains in the housing 210, while preventing dew condensation from occurring therein by means of a temperature difference caused by the change in the internal temperature of the housing 210

The mesh net 270 is disposed on the outside of the cooling tube 260 to prevent the grains being put to the housing 210 or stored in the housing 210 from coming contact with the cooling tube 260, so that the grains can be prevented from being damaged by means of freezing or serious cold.

The fixing means 280 is insertedly fitted to the first drain hole 233 of the dew condensation prevention means 230.

Also, the fixing means 280 is formed of a tube (not shown) that is adapted to insert the first pipe 251 and the second pipe 252 coupled to the refrigerant inlet and the refrigerant outlet of the evaporator 250 and a drain pipe 281 for draining the condensed water thereinto.

Briefly, the tube is open on both ends thereof in such a manner as to insert the first pipe 251, the second pipe 252, and the drain pipe 281 thereinto.

In this case, an empty space is formed between the inner peripheral surface of the tube and the pipes 251, 252 and 281, and through the empty space, undesirably, the external air may be introduced into the cooling tube 260.

So as to solve the problem, the grain refrigerator 200 according to the present invention is configured to allow a synthetic resin to be filled and hardened in the empty space after the first pipe 251, the second pipe 252, and the drain pipe 281 have been inserted into the tube as the fixing means 280, thereby blocking a path along which the external air is introduced into the cooling tube 260.

In this case, the synthetic resin may be selected from various synthetic resins as well known, but desirably, it may be a urethane resin or silicone.

The tube as the fixing means 280 inserts the first pipe 251 and the second pipe 252 for introducing and discharging the refrigerant into the refrigerant inlet of the evaporator 250 from the compressor and from the refrigerant outlet of the evaporator 250 and the drain pipe 281 for draining the condensed water of the evaporator 250 thereinto, and among the pipes, in this case, the first pipe 251 and the second pipe 252 pass through the tube in a state where they are already coupled to the evaporator 250. Otherwise, they are coupled to the evaporator 250 in a state where they are inserted into the tube.

Through the insertion of the first pipe 251 and the second pipe 252 coupled to the evaporator 250 and the drain pipe 281 into the fixing means 280, accordingly, the fixing means 280 can be easily and conveniently fixed to the first drain hole 233 of the dew condensation prevention means 230, and besides, the fixing means 280 functions as a shock absorber for the first pipe 251 and the second pipe 252, during they are operated, thereby decreasing their vibration noise.

In this case, the first pipe 251, the second pipe 252, and the drain pipe 281 are surrounded with the tube as the fixing means 280, but when the tube is inserted into the first drain hole 233 of the dew condensation prevention means 230, it may be torn or abraded by means of external friction.

According to the present invention, further, the outer peripheral surface of the tube as the fixing means 280 is surrounded with a pipe 282, thereby preventing the tube from being torn or abraded when the tube is inserted or separated into and from the first drain hole 233.

Furthermore, a filler (silicone) is filled in a space between the inner peripheral surface of the pipe 282 and the outer peripheral surface of the fixing means 280 so as to perform moisture sealing.

Accordingly, the filler prevents the moisture produced from the fixing means 280 by means of the temperature difference between the first pipe 251 and the second pipe 252 during their operation from being discharged to the outside, thereby giving no damage to the grains stored in the housing 210.

Additionally, the grain discharge stand 290 is located on the underside of the grain discharge hole formed at the center of the lowermost portion of the housing 210 to put the grains stored inside the housing 210 therein and to thus discharge them to the outside.

The grain discharge stand 290 includes discharge holes 291 communicating with the grain discharge hole formed on top thereof, a shelf 292 formed on the underside thereof in such a manner as to be open at the front and back surface thereof, and a drawer 293 moving forward and backward from the inner side of the shelf 292 by means of a push operation applied from the outside to open and close the discharge holes 291 and to thus put and discharge the grains stored in the housing 210 downward.

Accordingly, the grain discharge stand 290 discharges the grains stored in the housing 210 by desired quantity by means of the discharge holes 291 and the push operation of the drawer 293.

As described above, the grain refrigerator 200 according to the present invention is configured to have the dew condensation prevention means 230, the support plate 240, the evaporator 250, and the cooling tube 260 fitted to the fixing rod 220 located in the housing 210 and also to have the first pipe 251 and the second pipe 252, which are coupled to the evaporator 250, and the drain pipe 281 inserted into the fixing means 280 and then fitted to the dew condensation prevention means 230, so that the first pipe 251, the second pipe 252, and the drain pipe 281 can be easily and simply fixed to the dew condensation prevention means 230, without any need to one by one insert them into the dew condensation prevention means 230, thereby greatly reducing the man hour for making the grain refrigerator 200 to improve the productivity. In addition, the dew condensation can be prevented from occurring in the cooling tube 260 by means of the dew condensation prevention means 230, and accordingly, the grains can be stored in the housing 210, while preventing them from being damaged due to the dew condensation of the cooling tube 260.

As set forth in the foregoing, in more detail, the grain refrigerator according to the present invention is configured to have the support plate adapted to support the cooling tube and the evaporator located inside the cooling tube, the support plate having the through hole adapted to pass the first and second pipes for introducing and discharging the refrigerant and the drain pipe for discharging the condensed water therethrough, configured to have the dew condensation prevention means located on the underside of the support plate to prevent the dew condensation of the cooling tube from occurring and having the first drain hole communicating with the through hole of the support plate, and configured to have the fixing means for insertedly fixing the first pipe, the second pipe and the drain pipe to the first drain hole of the dew condensation prevention means, so that the first pipe, the second pipe, and the drain pipe can be easily and simply fixed to the dew condensation prevention means, thereby simplifying the process of making the grain refrigerator and also preventing dew condensation on the cooling tube from occurring by means of the dew condensation prevention means to allow the grains to be stored for a long time, while preventing them from being damaged due to the dew condensation.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A grain refrigerator comprising:
   a housing to store grains therein;
   a bracket located at an inside lower portion of the housing and having a fixing rod located at the center thereof and extending in an upward direction;
   a dew condensation prevention member having a shape of a cylinder whose top is open, located on top of the bracket, and including a space portion formed at the inside thereof, a first insertion hole formed at the bottom thereof to insert the fixing rod thereinto, and a first drain hole formed spaced apart from the first insertion hole;
   a support plate having a shape of a disc whose underside is supported against a top periphery of the dew condensation prevention member and including a fixing hole formed at the center of top thereof to fixedly pass the fixing rod therethrough and a through hole spaced apart from the fixing hole;
   an evaporator located on the support plate, having a spiral outer appearance, and having a first pipe and a second pipe connected to a lower portion of the evaporator for respectively introducing and discharging a refrigerant there-through;
   a cooling tube having a shape of a cylinder whose bottom is open and located on top of the support plate in such a manner as to insert the evaporator thereinto to discharge cool air to the outside; and
   a fixing member adapted to fix a plurality of fixing pipes therein, the fixing pipes including a drain pipe whose one end is located inside the cooling tube and the other end is located to the outside of the housing to discharge condensed water in the cooling tube to the outside, a tube whose both ends are open to allow the first pipe, the second pipe, and the drain pipe to be located therein, to pass through the first drain hole, and to be exposed to the outside of the housing, and a pipe for inserting the tube thereinto,
   wherein the first pipe and the second pipe connected to the lower portion of the evaporator pass through the through hole of the support plate and the first drain hole of the dew condensation prevention member and are thus exposed to the outside of the housing, and so as to prevent external air from being introduced into the cooling tube, a space between the inner peripheral surface of the tube and the outer peripheral surfaces of the pipes located inside the tube is filled with a synthetic resin, while a space between the tube and the pipe is being filled with a filler.

2. The grain refrigerator according to claim 1, further comprising a base plate located on top of the support plate and having a concave portion formed between a center and an outer peripheral surface thereof, a second insertion hole formed at the center thereof to pass the fixing rod therethrough, and a second drain hole formed at the concave portion thereof, the first pipe, the second pipe, and the drain pipe passing through the second drain hole.

* * * * *